April 27, 1965 T. P. DIXON 3,180,991

RETICLE FOR AN INFRARED TRACKING SYSTEM HAVING GROUPS OF SPOKES AND EACH SPOKE OF EACH GROUP PARALLEL WITH THE OTHER SPOKE

Filed Oct. 22, 1962 2 Sheets-Sheet 1

INVENTOR.
THOMAS P. DIXON
BY [signature]
ATTORNEY

INVENTOR.
THOMAS P. DIXON
BY [signature]
ATTORNEY 3,180,991

RETICLE FOR AN INFRARED TRACKING SYSTEM HAVING GROUPS OF SPOKES AND EACH SPOKE OF EACH GROUP PARALLEL WITH THE OTHER SPOKE

Thomas P. Dixon, Northridge, Calif., assignor to International Telephone and Telegraph Corporation, Nutley, N.J., a corporation of Maryland Filed Oct. 22, 1962, Ser. No. 232,007
9 Claims. (Cl. 250—83.3)

This invention relates to an infrared tracking system and to a reticle for the infrared tracker.

It is well known that the basic function of space filtering reticles is the enhancement of those components of the spatial radiance distribution in the scene which coincide with the periodicity of the reticle pattern. For this reason, the ideal reticle for discrimination in favor of a point target would be of the checkerboard type. It is rarely used, however, because of its inability to chop reliably target images moving along the boundaries of the checkerboard elements, and also because it is affected with virtually unavoidable phase jumps in the modulated signal whenever the target image moves from one row of elements to any of the neighboring rows.

Due to these shortcomings of the checkerboard reticle, the application of spoke reticles with radial or involute patterns has become widely accepted wherever high degrees of space filtering are essential. These types of reticles and their effectiveness for background suppression have been studied and their shortcomings have been noted.

An object of this invention is to provide an infrared tracking system which has a high degree of background suppression.

Another object is to provide a reticle for the infrared tracker which provides a greater degree of discrimination of a target over the background.

A feature of this invention is an infrared tracking system which includes an optical system, a reticle disposed adjacent the optical system which comprises a transparent disk having disposed thereon a plurality of groups of non-light transmissive spokes equally spaced about the center of the disk, the width of each said group and the center line space between two of said groups being equal. Means are provided to rotate the disk and to derive from the rotation of the disk a reference voltage and from an infrared detector disposed adjacent the reticle, there is derived a pulse signal. The envelope of the pulse signal is detected and from this envelope there is derived the vertical position of a target and from the phase relation between the reference signal and the pulse signal, the horizontal position of the target is ascertained.

Another feature is a reticle for the infrared tracker which comprises a transparent disk, a plurality of groups of non-light transmissive spokes which are disposed in equal spaced relation about the center of the disk, the width of each said group and the center line width of each space between two said groups being equal.

Another feature is that in the reticle only one spoke of each group of spokes is radial with the center and the other spokes of the group are parallel to the radial spoke.

The above-mentioned and other features and objects of this invention will become more apparent by reference to the following description taken in conjunction with the accompanying drawings, in which.

Figures 1, 2:
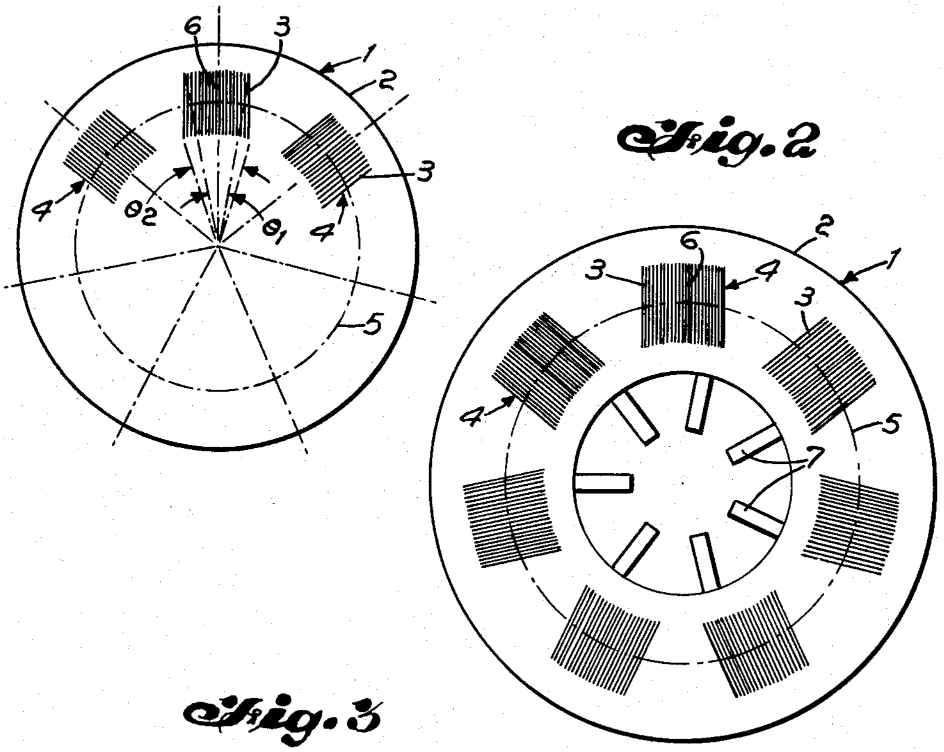
FIGURE 1 is a plan view of the reticle of this invention useful in describing the theory of the reticle configuration.
FIGURE 2 is another plan view of the complete reticle.

In a conventional radial-spoke reticle the image field is limited by a trapezoidal field stop and chopped by a reticle with $n$ radial spokes and $n$ gaps moving across the field. A straight cloud edge may traverse the field in a direction deviating from that of the spokes by not more than $$\frac{w}{2nh}$$

radians. This edge shall separate 2 areas with the uniform illuminations $E_0$ and $E_c$ watts/cm.². The former could correspond to the blue sky, the latter to the image of a sunlit cumulus cloud.

Then it can be seen by a simple geometric consideration that the transmitted flux will be modulated by the moving reticle with peak-to-peak amplitudes up to $$(1) \qquad A_B = \frac{wh}{2n}(E_c - E_o) \text{ watts}$$

For later evaluation, it is convenient to express this quantity in terms of the spectral steradiancy of the background $S(\lambda)_c$ and $S(\lambda)_0$ respectively. With an optical system of focal length $f$, diameter D, and transmission T within a spectral band of width $\Delta\lambda$, the illumination and background steradiancy are related by $$(2) \qquad E = \frac{\pi T D^2}{4f^2} S(\lambda)\Delta\lambda \text{ watts/cm.}^2$$

and from (1) and (2) the clutter amplitude becomes $$(3) \qquad A_B = \frac{wh\pi T D^2 \Delta\lambda}{8nf^2}(S(\lambda)_c - S(\lambda)_0) \text{ watts}$$

In daylight operation this amplitude may assume values exceeding the detector noise by far and will be the most important factor limiting the operational range of the instrument.

In the case of the reticle of this invention, the above generally very unfavorable value is obtained only during a small fraction of the chopping cycle. It may be readily seen that in this case the modulation of a straight cloud edge is equivalent to that which would occur with a conventional radial-spoke reticle if the disturbing edge were rotated at a uniform rate by an angle $\alpha$ during the transit of the chopping frame, where $\alpha$ is the deviation of the outermost spokes of the frames of a non-radial-spoke reticle from the radial direction. Consequently, the amplitude of the modulation of the edge will go through zeros when it deviates from perfect alignment with the spokes by integral multiples of $$\frac{w}{nh}$$

radians and in intermediate positions it will assume maxima decreasing from he peak $A_B$ given by Equation 1 to $$\frac{A_B}{3}, \frac{A_B}{5}, \frac{A_B}{7} \ldots$$

Thus, the application of this non-radial spoke reticle will significantly reduce the average power of severe clutter signals. My novel reticle contains $n=25$ spokes and an equal number of gaps. Since width $w$ and height $h$ of the chopping frames are equal, the angular increments of misalignment between cloud edge and spokes are $$\frac{w}{nh} = \frac{1}{25} \text{ radian}$$

and with an angular width of $$\frac{360°}{14} = 25.70° = 0.448 \text{ radian}$$

for the chopping frame 25 x 0.224 minima of modulation are obsserved in each chopping cycle causing the intermediate maxima to drop to ⅙ of the value which would be observed with a conventional radial-spoke reticle.

With reference to FIGURE 1, there is shown the reticle 1 of this invention with only a few of the groups of spokes which will illustrate the theory on which this invention is based. It consists of a quartz disk 2 having deposited upon it a plurality of groups 3 of parallel spokes 4 spaced equally around the disk. At the center line circle 5 through the groups of spokes the spacing between the adjacent groups is exactly equal to the width of the group. This space contains a coating having a transmission of fifty percent to infrared energy. Because of this coating, the infrared detector, which is disposed adjacent the reticle, will receive the same amount of energy from a large area source regardless of whether a group of spokes or the blank space is in the optical path. If the transmission of the blank areas is matched exactly to the integrated transmission of the spoke areas, there will be no frame-rate signal appearing in the output from the detector. Each of the spokes are arranged in a parallel pattern within each group. The spokes 4 are arranged in a parallel pattern within each group 3. The groups of spokes are spaced so that the distance across the group at the center line 5 is equal to the distance between two of the groups. As described later, it is preferable to have the space between the groups semi-transparent to avoid group-rate modulation of large area sources. A radial-spoke reticle provides space filtering by modulating completely the small area target image (which is no greater than the width of a spoke) and only partially modulating the large area background image. This novel reticle provides a significant improvement over the radial spoke type by having each of the parallel spokes cut the large area image edge at a different angle. This means that regardless of the orientation of the undesirable background pattern, only a small percentage of the total number of spokes in each group will chop the image edge completely. With a radial-spoke reticle some orientations of the background pattern will be chopped completely (edges) and will generate a much larger background signal. The reticle of this invention will improve the ratio of signal from the target image to the signal from the background image by as much as a factor of ten for some types of backgrounds.

From FIGURE 1 it may be seen that the angle subtended by the spoke pattern increases from $\theta_1$ to $\theta_2$ as the target image moves from the top of the field to the bottom. The same number of spokes are contained in both of these angles but the time required for the target image to traverse them is different. Therefore, the frequency of the signal will be greater when the image is at the top of the pattern and the duty cycle of its envelope will be less. If an FM discriminator is tuned to the frequency of chopping for a target in the center of the field, it will produce a plus or minus output as the target moves up or down from the center. A duty cycle detector may be used in place of the FM discriminator. The duty cycle of the signal envelope will be exactly fifty percent if the target is in the center of the field. This fifty percent duty cycle signal (square wave) contains only odd harmonics. When applied to a circuit that will extract a second harmonic, the output of the circuit will be zero when the target is on center and will vary in amplitude and phase as the target moves up or down in the field. If the target should move toward the bottom of the field of view, it may be seen that the target will be chopped for a greater percentage of the reticle rotation and a smaller percentage of time will be spent in the blank space between the groups of spokes, and in this case, the resulting signal will have a duty cycle greater than fifty percent. The measurement of the duty cycle of the signal from the infrared detector therefore is a direct indication of the vertical position of the target within the field of view. If the target moves to the right or left from the optical axis, the duty cycle will not change but the signal will be displaced in phase from a time reference. By comparing this signal with a reference signal, an accurate indication of the horizontal position of the target within the field of view will be obtained. Referring to the top group of spokes in FIGURE 1, it is seen that only one spoke 6 is radial to the center of the disk 1.

In FIGURE 2 there are shown seven groups 4 of spokes equally disposed about the center of the disk 2 on the center line 5 through all the spokes. It can be seen that the space between two of the groups is equal to the width of a group of spokes. To provide for the generation of a reference signal, there are disposed seven pins 7 of magnetically permeable material for actuating a magnetic pickup positioned adjacent thereto. As shown in the figures, each group 4 of spokes in the reticle 1 contains twenty-five spokes and twenty-five spaces.

Figure 3:
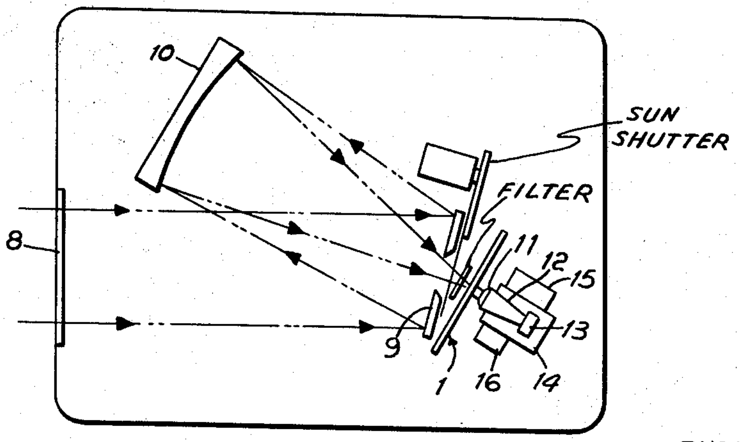
FIGURE 3 is the optical schematic of the tracking system.

The optical unit shown in FIGURE 3 comprises an entrance aperture 8, and a pierced folding mirror 9 which reflects the infrared energy from the target to the imaging spherical mirror 10. The energy is caused to converge by the spherical mirror 10 so that it passes through the small hole in the folding mirror 9 and forms a real image of the target on the reticle 1. Energy that is transmitted by the reticle is collected by the germanium condensing lens 11 which covers a four degree total field of view and is condensed into a small area perpendicular to the optical axis by means of a condensing cone 12. The energy leaving the condensing cone 12 strikes a lead sulfide detector 13 which is a photoconductor whose resistance varies inversely with the amount of infrared energy falling upon it. By maintaining a fixed current bias through the cell, the amount of current flowing in the circuit will vary directly with the infrared energy. Because the change in conductance for practical amounts of infrared energy falling upon the cell is such a small percentage of its total conductance, it is desirable to measure the changes in conductance only. This is done by mechanically chopping the infrared energy ahead of the cell and A.C. coupling the electronic circuitry to eliminate the large D.C. component.

The reticle 1 is mounted on the gear head hysteresis synchronous motor 14 which drives it at the rate of 824 r.p.m. When the target is on the optical axis, its image will be chopped by the reticle spokes at the rate of 4800 c.p.s. The signal from the infrared detector 13 will consist of a group of twenty-five cycles at the rate of 4800 c.p.s. followed by an equal period of time at zero amplitude. As explained above, if the target moves up in the field of view, it will be chopped for a shorter period of time and will occupy the blank space between adjacent groups of spokes for a longer period of time thus providing a duty cycle of less than fifty percent. If the target should move toward the bottom of the field of view, it may be seen that it will be chopped for a greater percentage of reticle rotation, a smaller percentage of time will be spent in the blank space between groups of spokes and the resulting signal will have a duty cycle greater than fifty percent. The output of the detector 13 is coupled to a signal preamplifier 15. A reference preamplifier 16 which is connected to the output of a magnetic pickup (not shown) cooperates with the pins 7 on the reticle 1 to generate the reference signal.

Figure 4:
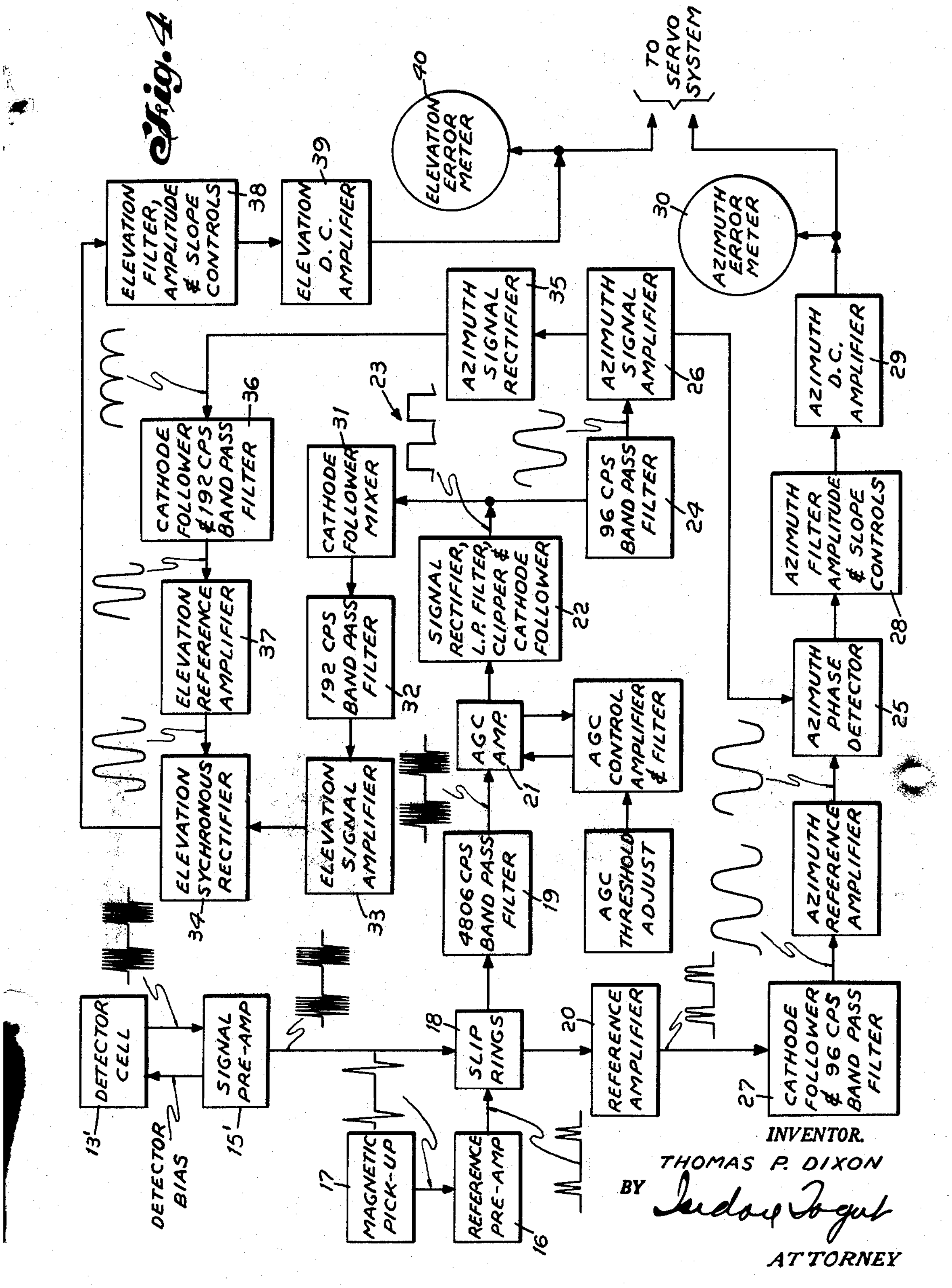
FIGURE 4 is a block diagram of the complete infrared tracking system of this invention.

Referring now to FIGURE 4 which shows the block diagram of the electronic components of the infrared tracking system, there is first shown the optical unit components referred to above, the detector cell 13′ and the signal preamplifier 15′. The output of the detector cell is shown as pulse signals having a frequency of 96 p.p.s. with CW signals in the pulse envelope which have a frequency of 4800 c.p.s.; the output of the signal preamplifier 15′ is the same pulse signal. The magnetic pickup denoted by the block 17 is coupled to the reference preamplifier 16′. Both signal outputs, from the signal preamplifier 15′ and the reference preamplifier 16′ are passed through slip rings represented by the block 18, respectively, to a 4800 c.p.s. bandpass filter 19 and a reference amplifier 20. The waveform at the output of the bandpass filter 19 is the same as that at the input except that a large percentage of the random noise has been removed. The output of the bandpass filter 19 is coupled to an AGC amplifier 21 which maintains the peak amplitude of the signal at a constant level over a wide dynamic range. The output of the AGC amplifier 21 is coupled to a signal rectifier, filter and clipper 22, which removes the 4800 c.p.s. component and leaves only a 96 c.p.s. rectangular wave as shown by the waveform 23. The rectangular wave is passed through a symmetrical clipper to remove any noise, ripple or jitter components that may be on the signal, and to maintain a constant peak-to-peak amplitude. At the output of the signal clipper 22, the signal is divided between the elevation circuit above and the azimuth circuit below. Following along the azimuth path, the signal is applied to a 96 c.p.s. bandpass filter 24. The output of this filter which is now a sine wave is amplified by an azimuth signal amplifier 26 and applied to one side of a full wave phase detector 25. The reference signal for the phase detector 25 is obtained by passing the reference pulses generated by the magnetic pickup 17 in the optical unit through an identical 96 c.p.s. bandpass filter 27. The D.C. voltage output of the phase detector 25 passes through an azimuth filter 28 and a D.C. amplifier 29. The D.C. azimuth voltage is then applied to an azimuth error meter 30 to indicate the azimuth angle between the target and the optical axis of the tracker, and to the servo system (not shown) that is used to orient the tracker.

Returning to the dividing point where the 96 c.p.s. signal output of 22 was first applied to the 96 c.p.s. bandpass filter 24, the signal is applied to a duty cycle detector. As noted above, as the target moves vertically through the field of view, the duty cycle of the output signal will vary from less than fifty percent to greater than fifty percent. From a Fourier analysis of a rectangular waveform, it may be seen that a symmetrical square wave—that is, one having a fifty percent duty cycle—does not contain any even harmonics. If the duty cycle of the waveform increases above fifty percent, a second harmonic content will be present with an amplitude that varies directly with the duty cycle. For a waveform having a duty cycle of less than fifty percent, there will also be a second harmonic content but with a phase 180 degrees displaced from that produced with a signal having a duty cycle greater than fifty percent. In the elevation error detecting system of this invention, the 96 c.p.s. waveform output of the signal rectifier 22 is applied via a cathode follower mixer 31 to a 192 c.p.s. bandpass filter 32 in order to isolate the second harmonic content of the waveform. If the target is directly on the optical axis, the output from the bandpass filter 32 will be zero. If the target deviates above or below the optical axis, the output of the 192 c.p.s. bandpass filter will represent the amount and the direction of the deviation. The output of the bandpass filter 32 is applied to an amplifier 33 and the output of the amplifier is applied to an elevation synchronous rectifier 34. By using the synchronous rectifier, a D.C. voltage is produced having a polarity representative of the direction of the target deviation and an amplitude representative of its magnitude. The reference voltage for the synchronous rectifier is obtained by full wave rectifying the sine wave output of the azimuth 96 c.p.s. bandpass filter and signal rectifier 35 and applying the voltage through cathode follower and bandpass filter 36 and through the reference amplifier 37 to the synchronous rectifier 34. The second harmonic content of the 96 c.p.s. sine wave is extracted in the 192 c.p.s. bandpass filter 36. The output of rectifier 34 is filtered in filter amplitude and slope control circuit 38 and the output of filter 38 is amplified in D.C. amplifier 39 and is applied to the elevation error meter 40 and to the servo system (not shown). Additional electronic equipment (not shown) can be provided to switch automatically to the infrared tracking system the instant the target appears.

While I have described above the principles of my invention in connection with specific apparatus, it is to be clearly understood that this description is made only by way of example and not as a limitation to the scope of my invention as set forth in the objects thereof and in the accompanying claims.

I claim:

1. A reticle for an infrared tracking system comprising:
 a transparent member,
 a plurality of groups of non-light transmissive spokes, means disposing said groups of spokes around said member, one spoke of each said group being radial with respect to the center and the other spokes of each said group being parallel to said radial spoke.

2. A retical for an infrared tracking system comprising:
 a transparent disc, a plurality of groups of non-light transmissive spokes,
 means disposing said groups of spokes in equal spaced relation about the center of said disc, the width of each said group and the width of each space between said groups at the center line through the middle of said groups being equal, one spoke of each said group being radial with respect to the center of said disc and the other spokes of each said group being parallel to said radial spoke.

3. A reticle according to claim 2 wherein the width of the spaces between said spokes and the spokes of each said group are equal.

4. A reticle according to claim 3 wherein said spaces between said groups comprise a coating having a transmission of fifty percent to infrared energy.

5. An infrared tracking system comprising:
 an optical system,
 a reticle disposed adjacent said optical system, said reticle comprising a transparent disc having disposed thereon a plurality of groups of non-light transmissive spokes equally spaced about the center of said disc, the width of each said group and the space between two of said groups being equal, one spoke of each said group being radial and the other spokes of each said group being parallel with respect to said radial spoke,
 means to rotate said disc,
 means to derive from said disc a reference voltage,
 an infrared detector disposed adjacent said reticle,
 means to derive from said detector a pulse signal,
 means to derive the envelope of said pulse signal,
 means to derive from said envelope the vertical position of a target,
 and means to derive from the phase relation between said reference signal and said pulse signal the horizontal position of the target.

6. An infrared tracking system according to claim 5 wherein said means to derive said reference voltage comprise a plurality of magnetically permeable members disposed in said reticle, the number of said members being equal to the number of said groups and pickup means disposed adjacent to said members whereby the rotation of said reticle causes pulses to be induced in said pickup means.

7. An infrared tracking system according to claim 6 further including means to derive from said pulse envelope signal the second harmonic of said signal and means to derive from said second harmonic signal the duty cycle of said pulse envelope, the duration of said duty cycle indicating the elevation of said target.

8. An infrared tracking system according to claim 7 wherein the means to derive said duty cycle duration comprise means to derive the second harmonic of said pulse envelope signal, means to derive the sine wave of said pulse envelope signal, means to derive the second harmonic of said sine wave signal and means to couple the second harmonic of said sine wave signal and the second harmonic of said pulse envelope signal to a synchronous rectifier whereby there is produced as the output of said synchronous rectifier a D.C. voltage having a polarity representative of the target deviation and an amplitude representative of its magnitude.

9. An infrared tracking system according to claim 8 further including means to compare said sine wave of said pulse envelope signal with said reference signal of the same frequency and means responsive to the phase difference between said sine wave signal and said reference signal to indicate the azimuth position of said target.

References Cited by the Examiner

UNITED STATES PATENTS

| | | | |
|---|---|---|---|
| 2,961,545 | 11/60 | Astheimer | 250—83.3 |
| 3,038,996 | 6/62 | Grube | 250—83.3 |

RALPH G. NILSON, *Primary Examiner.*

JAMES W. LAWRENCE, *Examiner.*